(12) United States Patent
Mandigo et al.

(10) Patent No.: US 6,602,436 B2
(45) Date of Patent: Aug. 5, 2003

(54) CHEMICAL MECHANICAL PLANARIZATION OF METAL SUBSTRATES

(75) Inventors: Glenn C. Mandigo, Boothwyn, PA (US); Ross E. Barker, II, Newark, DE (US); Craig D. Lack, Wilmington, DE (US); Ian G. Sullivan, Wilmington, DE (US); Wendy B. Goldberg, Wilmington, DE (US)

(73) Assignee: Rodel Holdings, Inc, Wilmington, DE (US)

( * ) Notice: Subject to any disclaimer, the term of this patent is extended or adjusted under 35 U.S.C. 154(b) by 0 days.

(21) Appl. No.: 09/925,209

(22) Filed: Aug. 9, 2001

(65) Prior Publication Data

US 2002/0058426 A1 May 16, 2002

Related U.S. Application Data

(60) Provisional application No. 60/224,339, filed on Aug. 11, 2000, and provisional application No. 60/227,466, filed on Aug. 24, 2000.

(51) Int. Cl.$^7$ .......................... B44C 1/00; H01L 21/302
(52) U.S. Cl. ........................ 216/88; 216/89; 438/692; 438/693; 451/57
(58) Field of Search .................... 216/88, 89; 438/692, 438/693; 451/57

(56) References Cited

U.S. PATENT DOCUMENTS

| 4,752,628 A | 6/1988 | Payne |
| 5,340,370 A | 8/1994 | Cadien et al. |
| 5,391,258 A | 2/1995 | Brancaleoni et al. |
| 5,489,233 A | 2/1996 | Cook et al. |
| 5,578,362 A | 11/1996 | Reinhardt et al. |
| 5,607,718 A | 3/1997 | Sasaki et al. |
| 5,637,031 A | 6/1997 | Chen |
| 5,652,177 A | 7/1997 | Pan |
| 5,786,275 A | * 7/1998 | Kubo .......................... 438/692 |
| 5,972,792 A | 10/1999 | Hudson |
| 6,022,264 A | 2/2000 | Cook et al. |
| 6,022,268 A | 2/2000 | Roberts et al. |
| 6,117,775 A | * 9/2000 | Kondo et al. ................ 438/690 |
| 2001/0024933 A1 | * 9/2001 | Sachan et al. ................. 451/41 |

FOREIGN PATENT DOCUMENTS

| EP | 0 373 501 A | 6/1990 |
| EP | 0 888 846 | 1/1999 |
| EP | 0 913 442 A | 5/1999 |
| WO | 96/25270 A1 | 8/1996 |
| WO | WO 99 64527 A | 12/1999 |
| WO | WO 00 37217 | 6/2000 |

* cited by examiner

Primary Examiner—George Goudreau
(74) Attorney, Agent, or Firm—Gerald K. Kita; Blake T. Biederman

(57) ABSTRACT

A method of polishing a wafer in a carrier by a polishing pad, controlling a ratio of platen speed to carrier speed (PS to CS) within a specific range, or controlling a first polishing step with a PS to CS ratio in the range of about 150:1 to about 1:150 followed by a second polishing step with a platen speed of about 0 to 20 rpm while maintaining the carrier speed used in the first polishing step, which maximizes clearing of residual material removed from a patterned wafer surface by polishing.

8 Claims, 7 Drawing Sheets

CHEMICAL MECHANICAL PLANARIZATION OF METAL SUBSTRATES

CROSS REFERENCE TO RELATED APPLICATIONS

This application claims the benefit of Provisional Application Ser. No. 60/224,339 filed Aug. 11, 2000 and Provisional Application Ser. No. 60/227,466 filed Aug. 24, 2000.

FIELD OF THE INVENTION

The invention described herein pertains to a polishing process for polishing semiconductor structures containing copper circuits utilizing polishing fluids with an abrasive content less than 3%.

BACKGROUND OF THE INVENTION

One of the critical requirements for the production of increasingly complex and dense semiconductor structures is the ability to retain planarity of semiconductor substrates. Without the ability to planarize, the complexity and density of the structures constructed on a semiconductor wafer are greatly limited. Chemical-Mechanical Polishing, or CMP, is an enabling technology in this area, since it has proved to be the most effective method for planarization of surface films on semiconductor substrates.

While the first applications of CMP technology focused on the polishing of dielectric films (i.e., $SiO_2$), polishing of metal structures used for circuit interconnects is increasing rapidly. Most metal structures contain three different films: a conductive metal layer (e.g., copper material), a barrier or liner (e.g. titanium or tantalum alloy) layer between the conductive metal layer and the adjacent dielectric layer, and a dielectric layer (e.g., silicon oxide). Integrated circuits are constructed by depositing layers of materials (metals, barrier layers and dielectric) on a wafer made of silicon oxide. After each layer is deposited, the layer is etched to create circuitry features. As a series of layers are sequentially deposited and etched, the outermost surface of the substrate, becomes increasingly non-planar. Nonplanar surfaces on the wafer result in defects in subsequent circuit layers leading to flawed circuitry. It is thus desirable to have planar surfaces.

Metal polishing slurries are designed to polish and planarize a conductive layer on a semiconductor wafer. The conductive layer is typically deposited on a dielectric layer and can be made of any conductive material such as tungsten, titanium, aluminum, copper, doped silicon, doped polysilicon, or a metal silicide layer. The dielectric layer typically has openings ("vias") that are filled with the conductive material to provide a path through the dielectric layer to previously deposited layers. After polishing, the conductive material remains only in the vias in the dielectric layer. U.S. Pat. No. 5,340,370 describes a polishing process for metals and some slurries developed for metals polishing.

Additional detail about polishing pads may be found in U.S. Pat. No. 5,578,362 to Reinhardt et al.

U.S. Pat. No. 5,652,177 discusses polishing silicon at substrate holder pressures from about 250 to about 350 lbs per square inch and a platen rotational velocity of about 20 to about 60 rpm. U.S. Pat. No. 5,607,718 discusses increasing the ratio of polishing velocity of aluminum to dissolution velocity of aluminum with respect to the polishing agent to minimize dishing. U.S. Pat. No. 5,972,792 describes a method for chemical-mechanical planarization of a substrate on a fixed-abrasive polishing pad in which a planarizing solution is dispensed onto the fixed-abrasive polishing pad. WO 96/25270 describes abrasive-free polishing compositions containing hydrogen peroxide for polishing tungsten.

Wafer non-uniformity is a significant problem during CMP of semiconductor device wafers due to differences in removal rates (RR) between the center and edge of the wafer being polished. Typically, non-uniformity is expressed as within wafer non-uniformity (WIWNU or % NU). Typically, wafer non-uniformity is minimized by altering the various carrier head pressures on the wafer, such as, the retaining ring pressure, or utilizing different pad-conditioning processes.

SUMMARY OF THE INVENTION

The method of this invention maximizes global wafer uniformity during chemical-mechanical planarization of semiconductor devices with softer interconnect metals such as copper material. Additionally, a method for removal of copper material residuals during chemical-mechanical planarization of patterned semiconductor wafers is also presented.

DESCRIPTION OF THE DRAWINGS

Embodiments of the invention will now be described, by way of example, with reference to the accompanying drawings taken in conjunction with the following detailed description.

DETAILED DESCRIPTION

Figure 1:
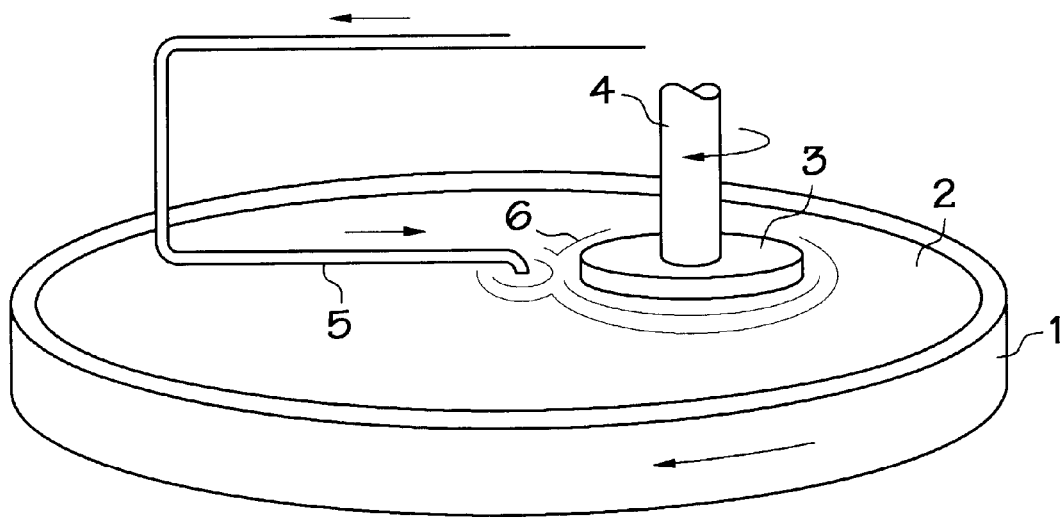
FIG. 1 is a schematic of a polisher showing the platen and carrier.

The method of this invention is for polishing a composite semiconductor structure containing a conducting metal (most preferably copper) interconnect layer, an insulating dielectric layer, and a barrier layer between the two; preferably, a copper metal layer, a silicon dioxide dielectric layer, and a barrier layer of tantalum or tantalum alloys. The method of this invention involves (i) operating at a ratio of the platen speed to the carrier speed from about 150:1 to about 1:150 (preferably the ratio of the PS to CS is in a range from about 10:1 to about 1:10, more preferably from about 6:1 to about 1:6 and most preferably about 2.5:1 to about 1:2.5); (ii) rotating the platen and carrier in opposite directions (for e.g., platen clockwise and carrier counterclockwise); and/or (iii) improving residual metal removal on patterned semiconductor substrates by reducing the platen speed.

In CMP, the substrate (semiconductor wafer) to be polished is mounted on a carrier or polishing head. The exposed surface of the substrate is placed against a rotating polishing pad. The surface of the polishing layer that is in contact with the semiconductor device is referred to as the polishing layer. The polishing pad may be an abrasive-free standard pad (without any abrasive in the polishing layer) or a fixed-abrasive pad (containing abrasive in the polishing layer). The carrier head provides a controllable pressure (or downforce), on the substrate to push it against the polishing pad. A polishing fluid with or without abrasive particles is then dispensed at the interface of the wafer and the polishing pad to enhance removal of the target layer (for e.g., metal in metal CMP processes). The polishing fluid is preferably water based and may or may not require the presence of abrasive particles, depending on the composition of the polishing layer of the polishing pad. An abrasive-free polishing fluid also referred to as a reactive liquid is typically used with a fixed-abrasive pad while a polishing fluid containing abrasive particles is typically used with a abrasive-free standard pad. An abrasive-free polishing fluid is substantially free of abrasive particles, i.e. <0.01% abrasive particles by weight of the polishing fluid. For polishing softer metal interconnects, such as copper material, the polishing fluid can contain up to 3% by weight of abrasive particles. Typical abrasive particles that can be used are any of the conventional abrasives used in CMP polishing of semiconductors such as alumina, silica, ceria, titania, zirconia and the like. Preferably, the composition used with the method of this invention does not contain abrasive particles.

The polishing fluid that could be used with the method of this invention is an aqueous composition having a pH of under 5 and preferably about 2.8 to 4.2, and more preferably, 2.8 to 3.8. It has been found that a pH of 4.5 and above results in significant reduction in removal rates of copper material during CMP of semiconductor substrates.

Additionally, the polishing fluid contains about 0.1 to 1.0% by weight, based on the weight of the composition, of polyacrylic acid or a blend or mixture of polyacrylic acids at least one having a relatively high number average molecular weight and the other or others having a relatively low number average molecular weight.

The number average molecular weight of the polyacrylic acid is determined by GPC (gel permeation chromatography). The polyacrylic acid used in the polishing fluid may have a number average molecular weight of about 20,000 to 150,000, more preferably 25,000 to 75,000. If a blend or mixture of two polyacrylic acids are used, a low number average molecular weight polymer having a molecular weight of about 20,000 to 100,000 and more preferably 20,000 to 40,000 is used. The high number average polyacrylic acid has a molecular weight of about 200,000 to 1,500,000, more preferably, 150,000 to 300,000. The weight ratio of the low molecular weight polyacrylic acid polymer to the high molecular weight polymer is between about 10:1 to 1:10; preferably between 4:1 and 1:4, and more preferably between 2:1 and 1:2.

It is possible to use polymers of the acrylic group such as copolymers of acrylic acid, polymethacrylic acid, copolymers of methacrylic acid, polyacrylamides, acrylamide copolymers, polymethacrylamides, methacrylamide copolymers and a variety of other copolymers of the above and obtain an acceptable polishing composition.

Also, it is possible to form polyacrylic acid polymers that are biodegradable, photodegradable, or degradable by other means that can be used in this invention for the polishing composition. An example of such a composition is a biodegradable polyacrylic acid containing segments of poly (acrylate co methyl 2-cyanoacrylate).

One particularly preferred blend comprises a polyacrylic polymer having a low number average molecular weight of about 30,000 and a polyacrylic polymer having a high number average molecular weight of about 250,000 in a 1:1 weight ratio. It is possible to use additional low molecular weight polyacrylic acids in the blend such as polyacrylic acids having a number average molecular weight of 1,000 to 5,000. It is possible to use very high molecular weight polyacrylic acid polymers (molecular weight over 1,500,000) or crosslinked polyacrylic acid polymers in these polishing fluids as an additional additive, by properly adjusting polishing conditions and other components of the polishing fluid. Also, it may be possible to use these high molecular weight or crosslinked polyacrylic acids in place of the aforementioned single polyacrylic acid or the blend of polyacrylic acids.

The polishing fluid also typically contains oxidizers, chemicals enhancing metal solubility (chelating agents or complexing agents), and surfactants. Polishing fluids containing abrasives also have additives such as organic polymers which keep the abrasive particles in suspension. Typical complexing agents are malonic acid, gluconic acid, glycolic acid, citric acid, phthalic acid, pyrocatechol, pyrogallol, gallic acid, or tannic acid. Additionally, a corrosion inhibitor such as benzotriazole (or BTA), may also be added to the polishing fluid.

The polishing fluid for use with the method of this invention may also contain about 1 to 15% by weight, preferably, 5 to 10% by weight, of an oxidizing agent such as hydrogen peroxide, iodates such as potassium iodate, nitrates such as cesium nitrate, barium nitrate, ammonium nitrate, mixtures of ammonium nitrate and cesium nitrate, carbonates such as ammonium carbonate, persulfates such as ammonium and sodium sulfate and perchlorates. Hydrogen peroxide is the preferred oxidizer in amounts of about 9% by weight.

The composition contains up to 3.0% and preferably, 0.1 to 1.0% of a complexing agent such as carboxylic acids containing two or more carboxylate groups with hydroxy groups as disclosed in Brancaleoni et al U.S. Pat. No. 5,391,258 issued Feb. 21, 1995 which is hereby incorporated by reference. Typical complexing agents include straight chain mono- and dicarboxylic acids and their salts such malic acid and malates, tartaric acid and tartarates, gluconic acid and gluconates, citric acid and citrates, malic acid and malonates, formic acid and formates, lactic acid and lactates. Polyhydroxybenzoic acid and acid salts, phthalic acid and acid salts also can be used.

The polishing fluid for use with the method of this invention may also further contain about 50 to 5,000 ppm (parts per million) by weight of an inhibitor such as BTA (benzotriazole) and TTA (tolyltriazole) or mixtures thereof are preferred. Other inhibitors that can be used are 1-hydroxybenzotriazole, N-(1H-benzotriazol-1-ylmethyl) formamide, 3,5-dimethylpyrazole, indazole, 4-bromopyrazole, 3-amino-5-phenylpyrazole, 3-amino-5-phenylpyrazole, 3-amino-4-pyrazolecarbonitrile, 1-methyimidazole, Indolin QTS and the like.

The polishing fluid for use with the method of this invention may also contain pH buffers such as amines, surfactants, deflocculates, viscosity modifiers, wetting agents, cleaning agents and the like.

FIG. 1 presents a schematic of a polisher used for CMP. The polishing platen 1 holds the polishing pad. The carrier 3 holds the substrate to be polished and is driven by the spindle 4. A pipe 5 delivers the polishing fluid 6 to the interface between the polishing pad and the substrate being polished. As may be seen from the figure, the direction of rotation of the carrier and the platen is clockwise. In commercially available polishing machines, the rotational speed of the carrier and the platen are capable of being independently controlled by drive and gear mechanisms.

Typically, polishing pads used in CMP have a rigid base substrate and a hydrophilic polishing layer. A preferred base layer may be made of cloth, paper, a noncorrosive metal, or a hydrophobic plastic, such as polyamide, polyimide, and/or polyester, particularly polyethylene terephthalate or "PET." The base layer may also be made from polyester fibers impregnated with polyester urethane or polyether urethane resulting in a microporous structure. Additionally, the pad material may be impregnated with other polishing aids or abrasives prior to coagulation to modify pad properties. Preferred pad materials comprise urethane, carbonate, amide, sulfone, vinyl chloride, acrylate, methacrylate, vinyl alcohol, ester or acrylamide moieties. The pad material can be porous or non-porous. Further, the pad matrix can be non-porous with or without fiber reinforcement.

Polishing pads are typically filled or unfilled. Preferred fillers include, but are not limited to, micro-elements, abrasive particles, gases, fluids, and any fillers commonly used in polymer chemistry, provided they do not unduly interfere negatively with polishing performance. Preferred abrasive particles include, but are not limited to, alumina, ceria, silica, titania, germania, diamond, silicon carbide or mixtures thereof, either alone or interspersed in a friable matrix which is separate from the continuous phase of the pad material. Alternately, the abrasive particles could be held by a binder material to the surface of the polishing pad. In some commercially available pads, polymeric microspheres add porosity to the pad and increase surface roughness, thereby reducing the tendency of hydroplaning and the need for aggressive pad conditioning. Typically, micro-texture of a pad surface comprises a plurality of protrusions with an average protrusion length of less than 0.5 micrometers.

Furthermore, the pad surface can have macro-texture. This macro-texture can be either perforations through the pad thickness or surface groove designs. Such surface groove designs include, but are not limited to, circular grooves which may be concentric or spiral grooves, crosshatched patterns arranged as an X-Y grid across the pad surface, other regular designs such as hexagons, triangles and tire-tread type patterns, or irregular designs such as fractal patterns, or combinations thereof. The groove profile may be rectangular with straight side-walls or the groove cross-section may be "V"-shaped, "U"-shaped, triangular, saw-tooth, etc. Further, the geometric center of circular designs may coincide with the geometric center of the pad or may be offset. Also the groove design may change across the pad surface. The choice of design depends on the material being polished and the type of polisher, since different polishers use different size and shape pads (i.e. circular versus belt). Groove designs may be engineered for specific applications. Typically, these groove designs comprise one or more grooves.

Grooved polishing pads for use with the method of this invention typically have a groove pattern with a groove depth in a range of about 0.075 to about 3 mm (more preferably about 0.3 mm to about 1.3 mm, and most preferably about 0.4 mm to 1 mm); a groove width in a range of about 0.125 mm to about 150 mm (more preferably about 0.75 mm to about 5 mm, and most preferably about 1 mm to about 2 mm); and a groove pitch in a range of about 0.5 mm to about 150 mm (more preferably about 3 mm to about 15 mm, and most preferably about 10 mm to about 15 mm).

The groove design on the surface of the polishing pad controls the removal rates observed during polishing. For example, deeper grooves will increase the residence time of slurry at the pad-wafer interface, thereby increasing removal rates across the wafer surface. If different removal rates are desired at the center and outer edges of the wafer, the groove design on different areas of the pad may be changed. For example, if a higher removal rate at the center of the wafer is desired, two different techniques may be employed to accomplish this objective. The number of grooves at the center of the wafer track on the pad may be reduced while increasing the number of grooves elsewhere on the pad. This increases the pad area in contact with the center of the wafer and helps increase the removal rate at the center of the wafer. Another technique to increase the removal rate at the center of the wafer is to provide shallow grooves in the center of the polishing pad and deeper grooves on the pad periphery. The impact of groove design on removal rate is more pronounced when an abrasive-free polishing fluid is used for polishing a substrate (for e.g. semiconductor wafer).

The following are typical polishing pads that can be used with the novel method of this invention to polish metal semiconductor substrates: metals pad described in Roberts et al U.S. Pat. No. 6,022,268 issued Feb. 8, 2000, pads containing polishing particles described in Cook et al U.S. Pat. No. 6,022,264 issued Feb. 8, 2000, pads described in Cook et al U.S. Pat. No. 5,489,233 issued Feb. 6, 1996, polymer impregnated fiber matrices typified by pads sold by Rodel, Inc. under the trade name SUBA, pads of a polymer sheet containing void spaces effected by in situ production or incorporation of hollow filler materials (typically pads sold by Rodel, Inc. under the trade names POLITEX and IC1010), pads of polymer sheets containing solid particles added as filers, which may optionally contain void spaces, effected either by in situ production or by incorporation of hollow filler materials (typically pads sold by Rodel Inc. under the trade names MH), and composite pad consisting of multiple layers of materials whose outer substrate contacting surface consists of a pad selected from one of the above.

Conditioning of a polishing pad is typically performed to remove abrasive particles and abraded particles from the pad and refreshes the surface of the pad with new polishing fluid. During conditioning, glaze on the polishing layer of the polishing pad is removed and a microscopic roughness is produced on the pad surface. Typically, a disk with abrasive material such as diamond grit is used for conditioning of polishing pads. Nylon brushes may also be used to condition the pad surface.

As a first approximation, removal rates of target substrates during polishing are determined by Preston's equation described in F. W. Preston, J. Soc. Glass Tech., XI, 214, (1917) which states that removal rate is proportional to the product of polishing down-force and relative velocity between the wafer and pad. For synchronous rotation of the wafer and pad, all points on the wafer surface experience the same relative velocity. Typically, the pad and wafer rotational speeds differ by about 10% resulting in differences in removal rate, hence non-uniformity, across the wafer surface producing center slow or center fast polishing.

An effective CMP process typically results in a substrate surface with the following characteristics:

High removal rate for the target layer on the substrate along with a final surface with high planarity;
Low small-scale roughness;
Low waviness;
Low non-uniformity; and
Minimal Scratches.

As previously stated, wafer non-uniformity is a significant problem during CMP of semiconductor device wafers due to differences in removal rates (RR) between the center and edge of the wafer being polished. Typically, nonuniformity is expressed as within wafer non-uniformity (WIWNU or % NU). WIWNU may be measured using a standard forty-nine point SEMI thickness measurement, measured at both 6 mm edge exclusion and 10 mm edge exclusion. In the examples supporting this invention, diameter scans with 91 points were performed to determine removal rates and % NU.

Figure 2:
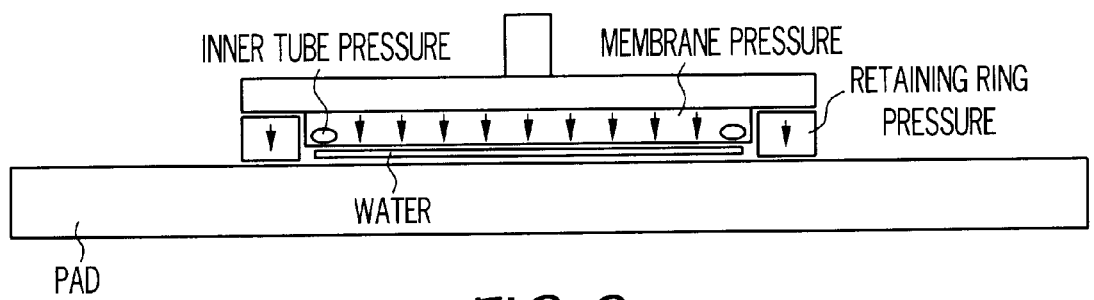
FIG. 2 is a cross-section of the wafer carrier showing the polishing pad, the wafer and the direction of the inner tube pressure, membrane pressure and retaining ring pressure.

Typically, the carrier and platen rotational speeds are matched to within 10% of each other. This dictates a platen speed to carrier speed ratio in the range of about 0.9 to 1.1. Hereinafter, for the sake of brevity, platen rotational speed will be referred to as platen speed (PS) and carrier rotational speed as carrier speed (CS). Further, the platen speed to carrier speed ratio will be referred to as the PS to CS ratio hereinafter. It is standard practice in the semiconductor industry to solve the global wafer non-uniformity problem during CMP by altering the carrier head pressures along with different pad-conditioning processes. FIG. 2 is a cross-section of the carrier with the wafer showing the direction of the retaining ring pressure portion of the carrier head pressure. However, the method of this invention demonstrates operating ranges of PS to CS ratios to obtain global wafer non-uniformity values less than 3%.

The following examples are provided to illustrate distinctive aspects of the method of this invention. A sheet resistance measuring tool manufactured by Creative Design Engineering, Inc. was used to measure copper material removal rates. In all instances, diameter scans, comprising 91 points, were performed across the wafer surface.

EXAMPLE 1

Figure 3:
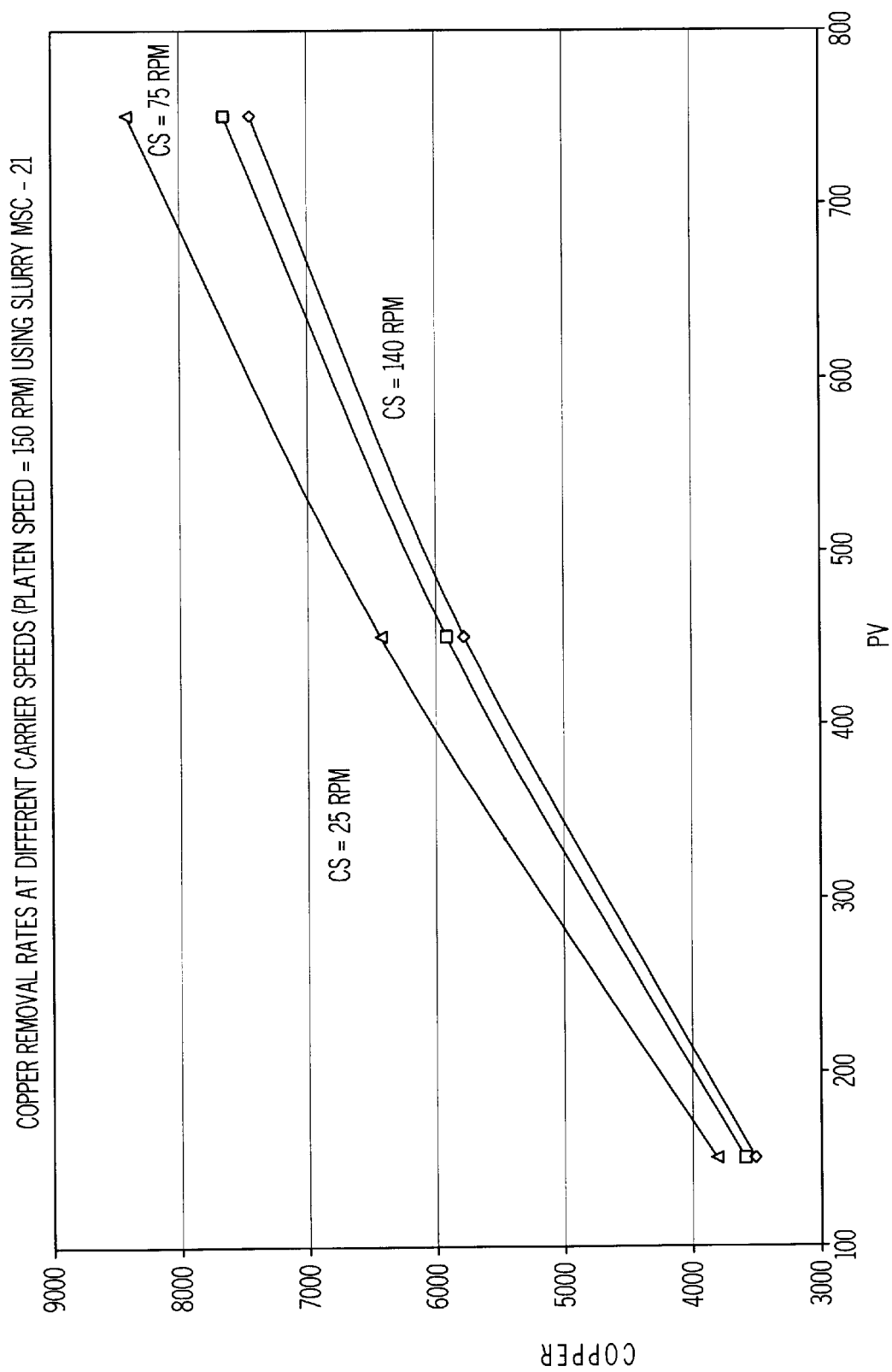
FIG. 3 shows copper material removal rates at different carrier speeds for a fixed platen speed of 150 rpm.
Figure 4:
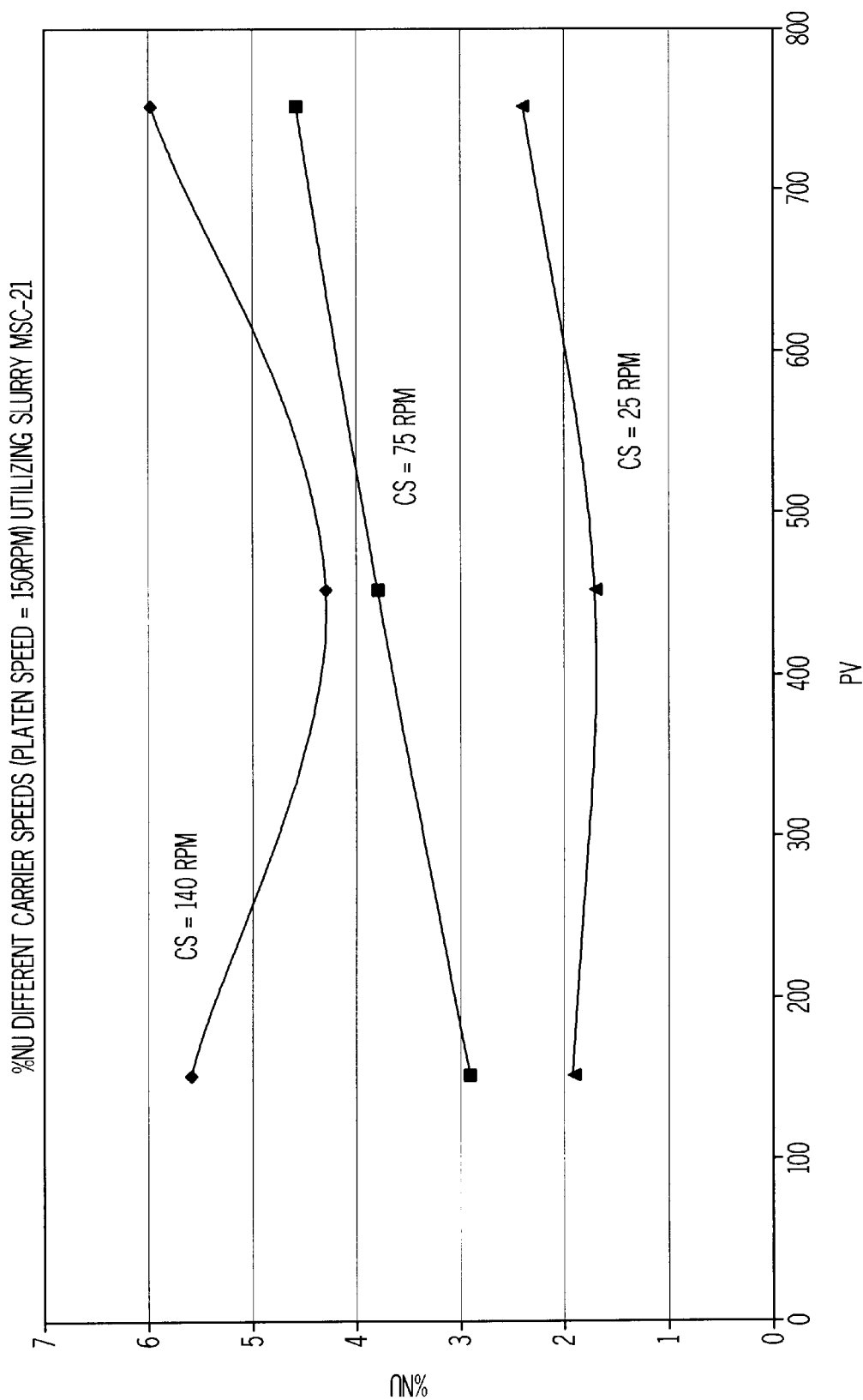
FIG. 4 presents % nonuniformity data for different carrier speeds, with a constant platen speed of 150 rpm, using polishing fluid MSC-21.
Figure 5:
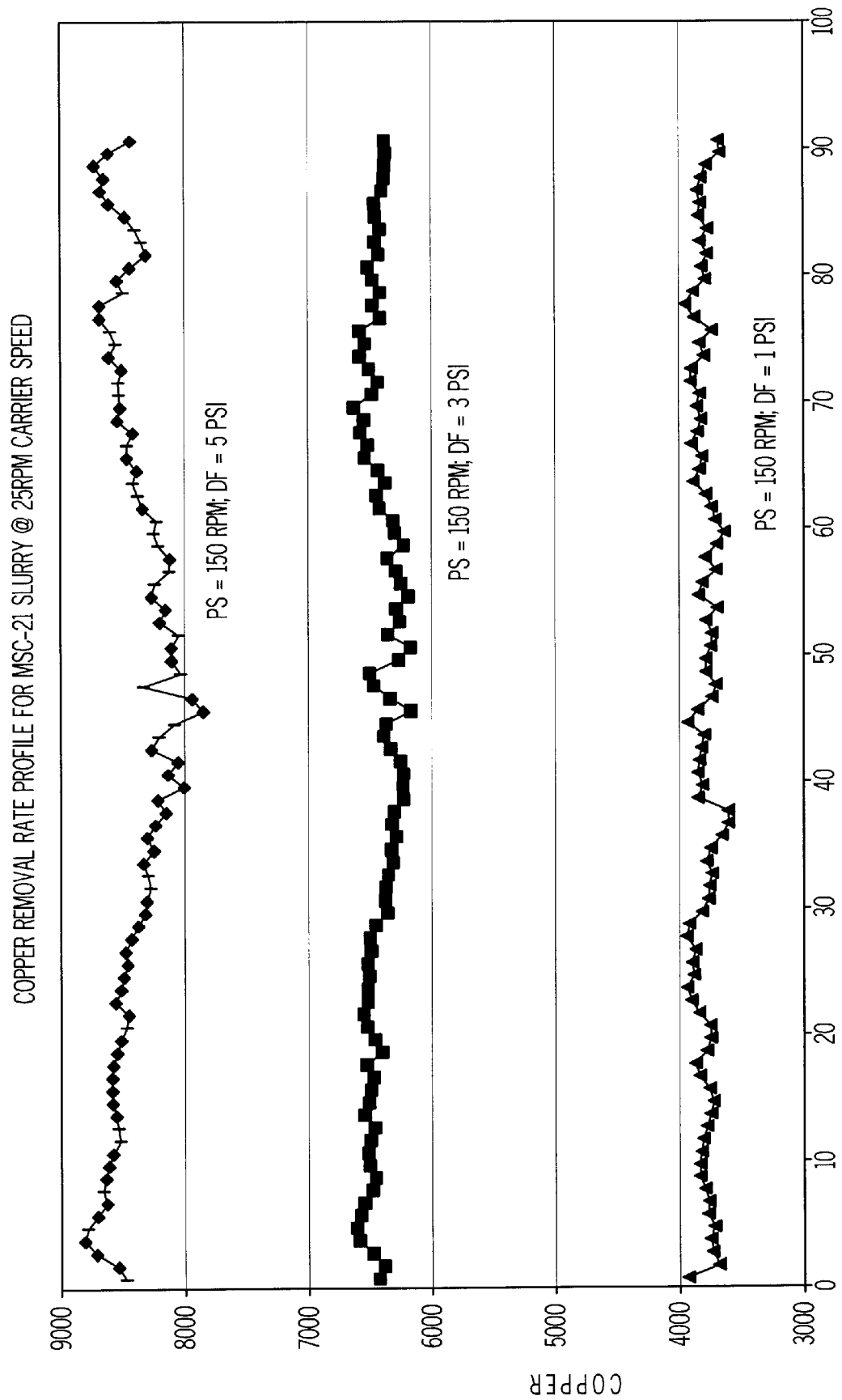
FIG. 5 presents copper material removal rates at a platen speed of 150 rpm, a carrier speed of 25 rpm, using polishing fluid MSC-21 (manufactured by Rodel, Inc.) and downforces of 1 psi, 3 psi and 5 psi, respectively.

A polishing test was conducted on an AMAT Mirra polishing machine utilizing an IC 1010 pad (an abrasive-free pad manufactured by Rodel, Inc.) with SUBA IV (manufactured by Rodel, Inc.) as the sub-pad. Polishing fluid MSC-21 (manufactured by Rodel, Inc.) was used to polish the copper material sheet wafers at a flow rate of 200 ml/min. The pad was pre-conditioned for 20 minutes utilizing a 100 grit diamond disk (manufactured by Abrasive Technology, Inc.). A down force of 10 psi and a platen speed of 63 rpm was used for all conditioning steps. All tests were duplicated on two wafers. Thus each data point on FIGS. 3, 4 and 5 is an average of data collected from identical tests on two wafers. A conditioning step of 20 second duration was also performed between wafer runs. Each wafer was polished for a duration of 60 seconds.

FIG. 3 is a plot of copper material removal rate, measured in Angstroms per minute, versus PV. PV is the product of platen speed, in rpm, and the down force on the carrier, in psi. Thus, for a fixed platen speed, PV is a measure of downforce. The platen speed was maintained at 150 rpm while determining the impact of different carrier speeds (25 rpm, 75 rpm, and 140 rpm) on copper material removal rates. The various carrier speeds at the fixed platen speed of 150 rpm, correspond to three different PS to CS ratios, namely, 6:1, 2:1 and 1.1:1, respectively. Three different down force values of 1 psi, 3 psi and 5 psi were investigated during this experiment.

As may be seen from FIG. 3, the copper material removal rate at a PS to CS ratio of 6:1, is higher than the corresponding copper material removal rate at PS to CS ratios of 2:1 and 1.1:1, for a given PV value, or downforce value (since platen speed is a constant). More significantly, the % NU, as shown in FIG. 4, was consistently lower than 3%, for a PS to CS ratio of 6:1 for different values of PV at a fixed platen speed of 150 rpm. The %NU values for PS to CS ratios of 2:1 and 1.1:1 at corresponding PV values are much higher in comparison.

FIG. 5 shows removal rates at different diameter scan locations on the wafer surface for a PS to CS ratio of 6:1 (Platen speed: 150 rpm, Carrier speed: 25 rpm). As expected from the Preston Equation, for a fixed PS to CS ratio, the copper material removal rate is significantly higher at higher down forces.

In summary, good uniformity (alternatively, low non-uniformity) is observed for low carrier speeds. Specifically, good uniformity (<3%) was observed for a PS to CS ratio of 6:1. With a different slurry, comparable results are expected for a PS to CS ratio of 1:6.

EXAMPLE 2

Figure 6:
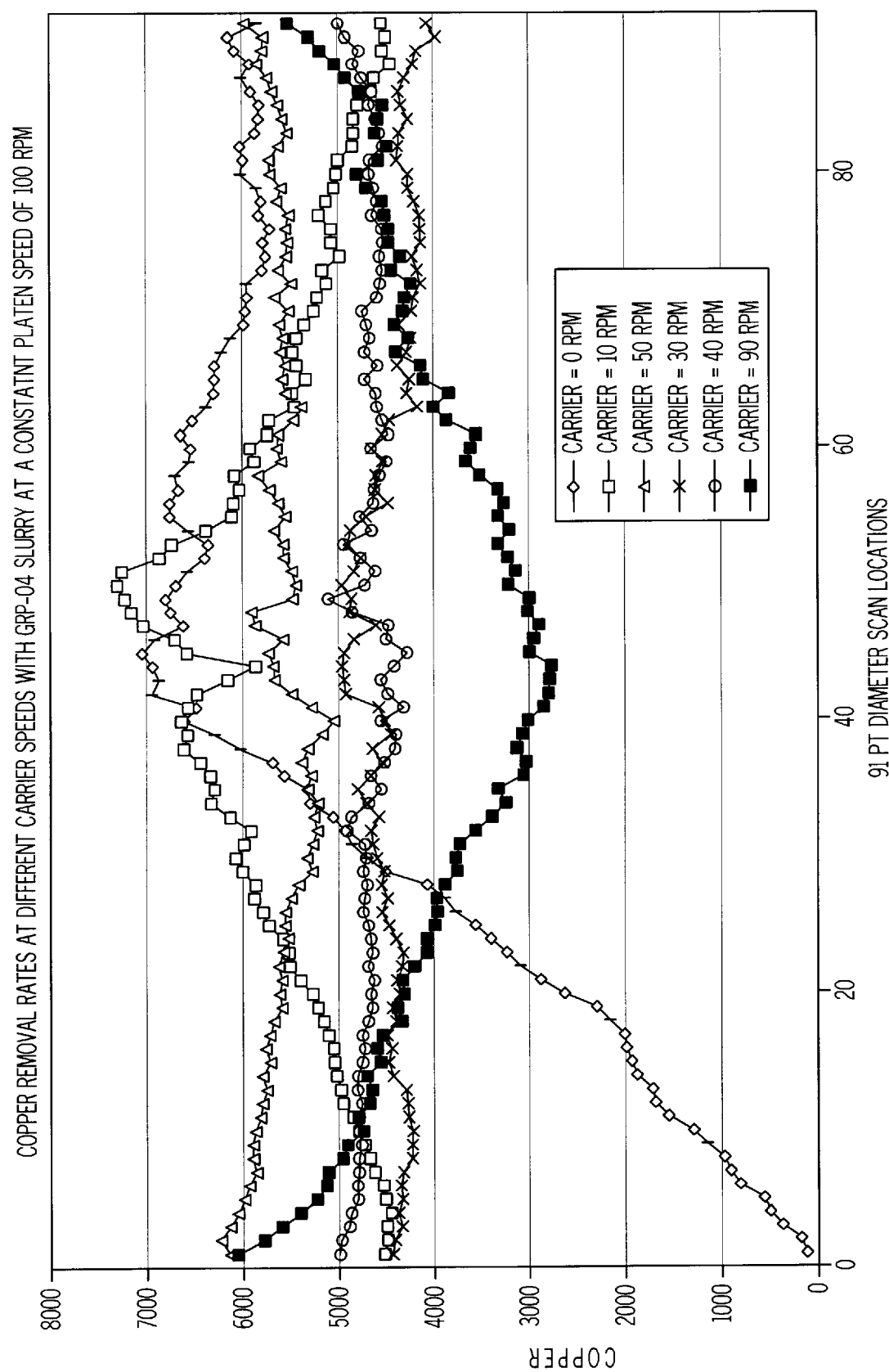
FIG. 6 presents copper material removal rates at different carrier speeds with GRP-04 fluid (being developed by Rodel, Inc.) at a constant platen speed of 100 rpm.

This example illustrates an optimum range of carrier speeds for obtaining good uniformity of removal rates on the wafer surface. A polishing test was run on a Westech 372U polishing machine utilizing copper material sheet wafers as the substrate; a metals 26 (K-X-Y Groove) polishing pad (an abrasive-free grooved pad ); and a GPM 1000 sub-pad. Both pads are manufactured by Rodel, Inc. A developmental polishing fluid, GRP-04, also manufactured by Rodel, Inc., was used at a flow rate of 200 ml/min. The impact of various carrier speed values on copper material removal rates at different diameter scan points was determined for a fixed platen speed of 100 rpm and downforce of 5 psi. Conditioning was performed at 10 psi utilizing a 100 grit diamond disk (manufactured by Abrasive Technology, Inc.). Preconditioning of 120 sweeps was utilized with 2 sweeps between wafer runs. All tests were duplicated on two wafers. Thus each data point on FIG. 6 is an average of data collected from identical tests on two wafers. Each wafer was polished for a duration of 60 seconds.

As illustrated in FIG. 6, a carrier speed of 40 rpm yielded uniform copper material removal rates across the wafer surface. The PS to CS ratio in this experiment is 2.5:1. At low carrier speeds the copper material removal rate at the center of the wafer is very high compared to the copper material removal rate at the wafer edge—a polishing characteristic labeled center fast in industry. Again at high carrier speeds, the copper material removal rate at the wafer edge is much higher than at the wafer center—a polishing characteristic labeled edge fast in industry. Thus, the optimal carrier speed in this example is in the range of 30 to 40 rpm, corresponding to a PS to CS ratio of 2.5:1. For a metals 26 pad, reduced carrier speed results in improved relaxation of the polishing pad, yielding a polishing layer that better conforms to the wafer surface, translating into more uniform copper material removal on the wafer surface. With a different slurry, comparable results are expected with a PS to CS ratio of 1:2.5.

EXAMPLE 3

Figure 7:
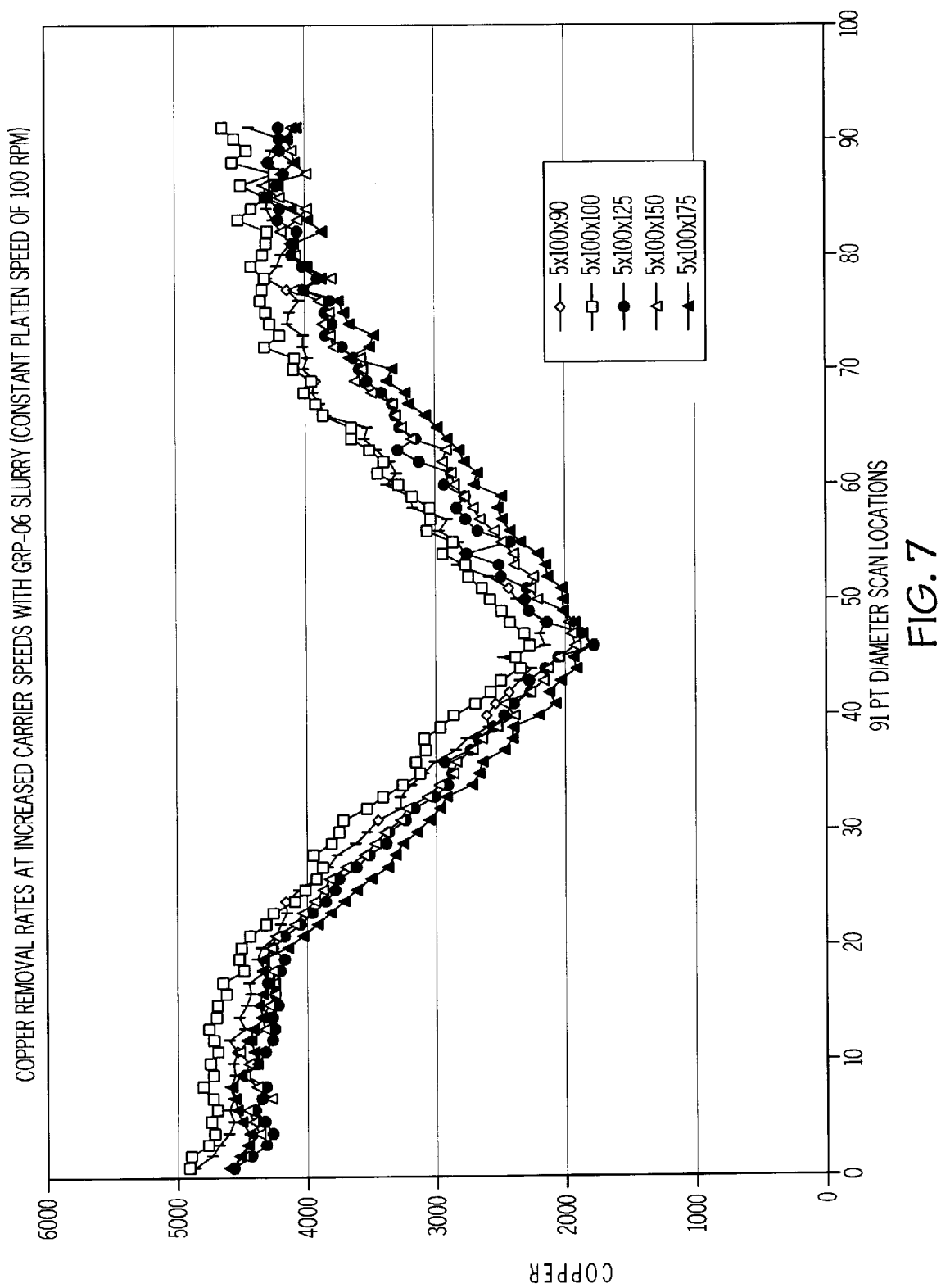
FIG. 7 illustrates copper material removal rates at increased carrier speeds for a fixed platen speed of 100 rpm, utilizing GRP-06 polishing fluid (being developed by Rodel, Inc.)
Figure 8:
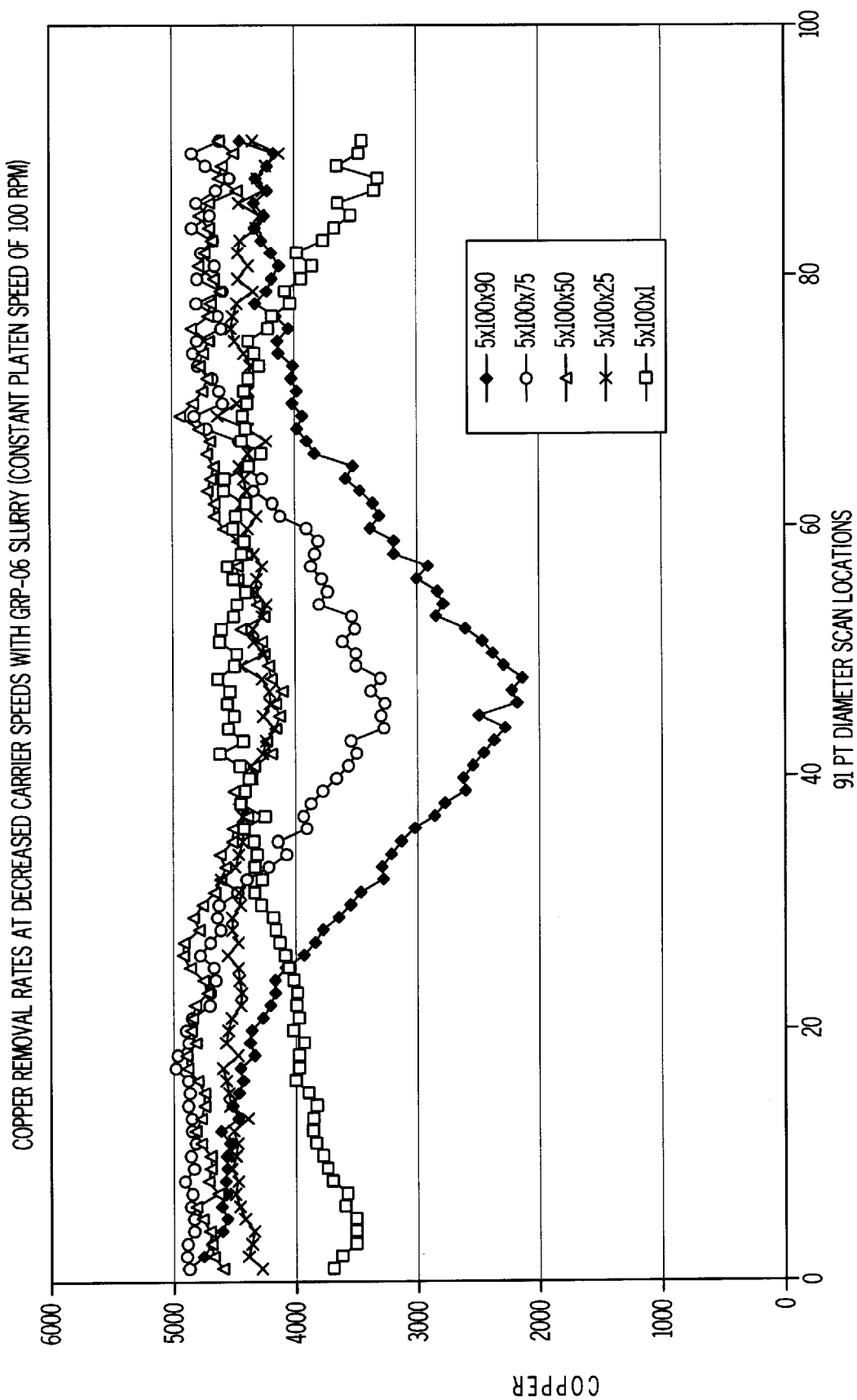
FIG. 8 illustrates copper material removal rates at decreased carrier speeds for a fixed platen speed of 100 rpm, utilizing GRP-06 polishing fluid (being developed by Rodel, Inc.)

A polishing test was run on the AMAT Mirra polishing machine utilizing copper material sheet wafers as the substrate; a metals 26 (K-X-Y Groove) polishing pad; and a GPM 1000 sub-pad. Both pads are manufactured by Rodel, Inc. A developmental polishing fluid, GRP-06, also manufactured by Rodel, Inc., was used at a flow rate of 200 ml/min. The impact of various carrier speed values on copper material removal rates at different diameter scan points was investigated further for a fixed platen speed of 100 rpm and downforce of 5 psi. The pad was preconditioned for 20 minutes utilizing a 100 grit diamond disk (manufactured by Abrasive Technology, Inc.). A down force of 10 psi and a platen speed of 63 rpm was used for all conditioning steps. All tests were duplicated on two wafers. Thus each data point on FIG. 7 and FIG. 8 is an average of data collected from identical tests on two wafers. A conditioning step of 20 second duration was also performed between wafer runs. Each wafer was polished for a duration of 60 seconds.

As shown in FIG. 7, holding the platen speed constant at 100 rpm at a downforce of 5 psi, and increasing the carrier speed from 90 to 175 rpm, created an edge fast process. The PS to CS ratio in this experiment ranged from 1.1:1 to 0.57:1. However, raising the PS to CS ratio from 1.1:1 to 4:1, all other test conditions being equal, yielded uniform removal rates across the wafer surface. FIG. 8 illustrates the uniformity of removal rates observed by dropping the carrier speed for a fixed platen speed of 100 rpm and a downforce of 5 psi, i.e., increasing the PS to CS ratio from 1.1:1 to 4:1. With a different slurry, comparable results are expected for a PS to CS ratio of about 1:4 to 1:1.1.

EXAMPLE 4

A SEMATECH 931 wafer with an initial copper material thickness of 15,000 angstroms was polished on the AMAT Mirra polishing machine using a metals 26 (K-X-Y Groove) polishing pad; a GPM 1000 sub-pad and GRP-04 polishing fluid at a platen speed of 100 rpm; a downforce of 5 psi; and a carrier speed of 15 rpm. A down force of 10 psi and a platen speed of 63 rpm was again used for all conditioning steps. The duration of this polishing test was 100 sec. Such polishing substantially removes the copper material, except for leaving residuals of the material on the patterned wafer. The patterned wafer was further polished but at a reduced platen speed of 20 rpm with the carrier speed at 15 rpm utilizing the same polishing fluid and conditioning steps. The duration of this polishing test was 40 sec. The patterned wafer after the second polishing step has insignificant or minimized residuals of the material to be removed by polishing. The reduced platen speed during the second polishing step increases the residence time of the polishing fluid on the polishing pad thereby increasing removal of residual copper material. It should be noted that the copper material layer thickness at the end of the first polishing step is in the range of about 500 to 1000 Angstroms. Thus, increasing the residence time of the polishing fluid on the polishing pad by decreasing platen speed during the second polishing step enhances removal of residual copper material on the patterned wafer surface. This effect will be enhanced when grooved pads with different groove designs are used for polishing the semiconductor substrate.

The CMP method of the present invention involves changing the PS to CS ratio to minimize wafer non-uniformity (less than 3%) across the semiconductor wafer surface. The method of this invention presents a first polishing step with an operating PS to CS ratio in the range of about 6:1 to about 1:1 (preferably about 6:1 to 2:1 and most preferably about 2.5:1); followed by a second polishing step with a platen speed of about 0 to 20 rpm while maintaining the carrier speed used in the first polishing step to maximize clearing of residual copper material from a patterned wafer surface due to increased residence time of the polishing fluid on the polishing pad. With a different slurry, comparable results are expected for a first polishing step with an operating PS to CS ratio in the range of about 1:6 to about 1:1 (preferably about 1:6 to 1:2 and most preferably about 1:2.5); followed by a second polishing step with a platen speed of about 0 to 20 rpm while maintaining the carrier speed used in the first polishing step to maximize clearing of residual copper material from a patterned wafer surface due to increased residence time of the polishing fluid on the polishing pad.

The following claims define this invention and should be accorded the broadest possible interpretation to encompass all modifications obvious to one skilled in the art.

What is claimed is:

1. A method for chemical-mechanical planarization of a metal layer on a semiconductor wafer, comprising:
   i. affixing the wafer in a rotatable carrier of a polishing machine, and rotating the carrier at a rotational carrier speed, CS;
   ii. affixing a polishing pad to a rotatable platen of the polishing machine, and rotating the platen at a rotational platen speed, PS, wherein the ratio of PS to CS is in a range of 2:1 to 10:1 and
   iii. contacting the wafer and the polishing pad with a fixed down force while maintaining relative motion therebetween, while dispensing a polishing fluid at an interface of the wafer and the polishing pad, the polishing fluid containing less than 0.01 weight percent abrasives, to provide a planarized surface of the wafer.

2. The method of claim 1 wherein the ratio of PS to CS has the range of 2:1 to 6:1.

3. The method 1, wherein the fixed downforce is in a range of about 1 to 10 psi.

4. The method of claim 1 wherein the fixed downforce is in a rang of about 1 to 5 psi.

5. The method of claim 1 wherein the polishing pad is an abrasive-free pad.

6. The method of claim 1 wherein the polishing fluid has a pH under 5 and further includes:
   i. polyacrylic acid having a number average molecular weight of about 20,000 to 150,000;
   ii. 1 to 15% by weight, based on the weight of the polishing fluid, of an oxidizing agent;
   iii. 50 to 5000 parts per million by weight of an inhibitor; and
   iv. up to 3% by weight, based on the weight of the polishing fluid, of a complexing agent.

7. The method of claim 6 wherein the polishing fluid has a pH of about 2.8 to 4.2 and the polyacrylic acid has a number average molecular weight of about 25,000 to 75,000 and is present in an amount of about 0.05 to 1.0% by weight, based on the weight of the polishing fluid.

8. The method of claim 6 wherein the metal is copper.

* * * * *